April 4, 1950        N. PORITZ        2,503,130
EDUCATIONAL DEVICE
Filed Aug. 26, 1946
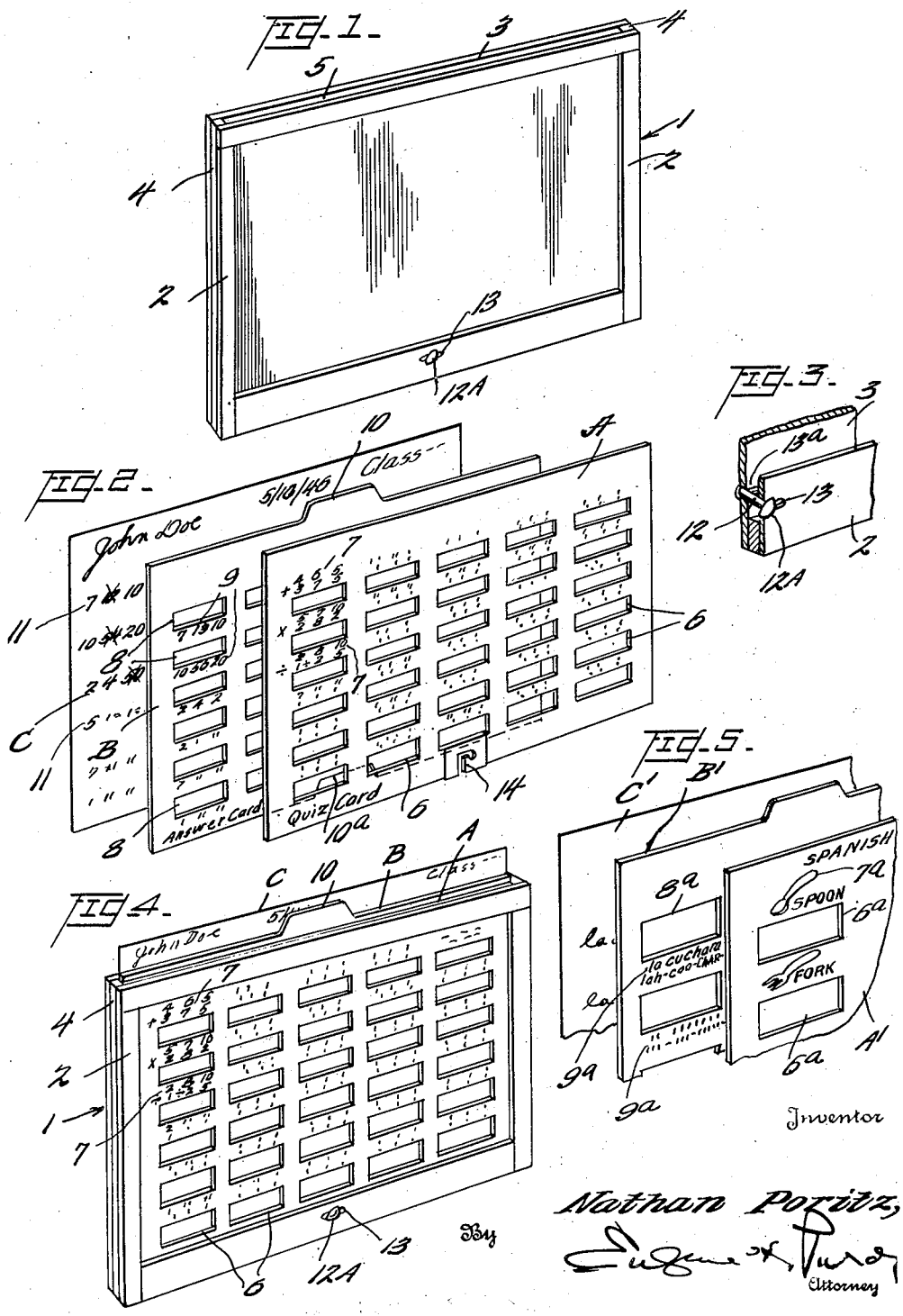
Inventor
Nathan Poritz,
By
Eugene H. Purdy
Attorney Patented Apr. 4, 1950

2,503,130

UNITED STATES PATENT OFFICE 2,503,130

EDUCATIONAL DEVICE

Nathan Poritz, Brooklyn, N. Y.

Application August 26, 1946, Serial No. 693,005

1 Claim. (Cl. 35—31)

This invention relates to educational devices of the self-teaching type and more particularly to such educational devices in which a quiz card and an answer card are arranged in such relationship that the student after mentally noting the answers, or after writing the answers upon a work sheet, may verify such answers from the answer card.

An important object of my invention is to provide in an educational device of the above character a stiff-backed open-faced panel for slidably receiving in superposed relation a plurality of cards bearing correlated data, at least one of said cards being provided with windows through which the data inscribed upon the face of an adjacent card may be seen. In the preferred form of my invention the panel is provided with means for locking a card in fixed position therein to prevent its accidental displacement when the adjacent card or work sheet is inserted or removed.

Another object of my invention is to provide in an educational device of the above character a plurality of cooperating cards both having windows located in registry when the cards are fully seated in the frame, one card having quiz data inscribed adjacent its windows and the other card having answer data inscribed adjacent its windows whereby the answers to the problems presented by the quiz data may be written through the windows onto a work sheet inserted behind the quiz and answer cards, after which the answer card may be shifted relative to the quiz card to allow the answers inscribed on the answer card to be viewed through the windows of the quiz card for verifying the answers written on the work sheet.

Still another object of my invention is to provide a card, adapted to be used in an educational device of the above character, having means cooperating with means on the card-receiving panel to releasably lock the card to the frame.

Other objects and advantages will be apparent from the following detailed description of a preferred embodiment of the invention, reference being had to the annexed drawing in which:

Figure 1 is a perspective view of a card-receiving panel constituting part of an educational device intended for the study of arithmetic;

Figure 2 is a view showing a quiz card, an answer card and a work sheet, in the order in which they are adapted to be associated with the panel of Fig. 1;

Figure 3 is a detail broken-away view of the panel showing the manner in which a locking pin on the frame of the panel engages a recess in the quiz card to hold the quiz card associated with the panel;

Figure 4 shows the panel having the two cards and the work sheet associated therewith; and Figure 5 is a fragmentary view of another form of quiz and answer cards adapted to be associated with the panel for the study of a foreign language.

The educational device shown in Fig. 1 comprises a panel I formed by a rectangular frame 2, a rigid backing member 3 coextensive with the panel and spacing strips 4 located between the frame and backing member and closing the two side and bottom edges of the panel.

Through the open slot 5 thus provided at the top of the panel is adapted to be inserted a quiz card A, an answer card B, and a paper work sheet C, all of rectangular shape and adapted to fit snugly between the three inner edges of the spacing strips 4.

As shown in Fig. 2, the quiz sheet A is provided with a plurality of windows 6 aand immediately above the windows is inscribed, as indicated at 7, suitably chosen data presented in the form of problems or memory tests. In the example here illustrated, the device being intended for the teaching of arithmetic, the data consists of simple problems in addition, substraction, multiplication and division.

Adapted to be slid into the panel behind the quiz card A is the answer card B. This answer card is provided with windows 8 in registry with the windows 6 in the quiz card and inscribed immediately below the windows, as indicated at 9, are the correct answers to the problems presented on the quiz card. The upper edge of this answer card is provided with a finger tab 10 to aid its insertion into and removal from the panel, while the bottom of the panel is formed with a cutaway portion 10a.

The work sheet C of ordinary writing paper is adapted to be inserted into the panel immediately behind the answer card B and is used by the student in writing in his answers, through the registering windows 6 and 8 of the quiz and answer cards, to the problems presented by the quiz card, these answers being indicated at 11. The stiff backing 3 of the panel, preferably wood or heavy cardboard, provides a solid writing surface for the work sheet.

In order to prevent accidental displacement of the quiz card A during the insertion or removal of the answer card B or the work sheet C, a pin 12 is mounted so as to slide within elongated openings 13 and 13a in the lower margins of the frame 2 and backing member 3, and the quiz card is formed with a bayonet slot 14 opening through its lower edge adapted to receive the pin. When the pin 12 registers with the opening of the bayonet slot, the quiz card drops to its lowermost position within the panel and then by shifting the pin along the openings 13 and 13a, by means of the head or finger piece 12A, this locks the card in place in the panel.

The educational device just described may be used in several different ways. For example, with the quiz card A inserted in the panel and locked in place by the pin 12, the answer card B and work sheet C may be inserted behind the quiz card and the student then marks in his answers in pencil through the windows 6 and 8 to the problems presented by the quiz card. Finally, the answer card is lifted upwardly, by means of the tab 10, to bring the correct answers on the answer card into view through the windows 6 of the quiz card. The answers on the work sheet will be momentarily obscured (or partially obscured, depending upon the size of the windows 6) by the answer card B when the latter is raised to note the correct answer to a given problem, following which it is allowed to drop back with the windows 8 in registry with the windows 6 in the quiz card A. The student then marks the answers on his work sheet that are incorrect and also lightly in pencil checks those problems on the quiz card that he has failed to answer correctly.

The student may now drill himself on the particular problems that he missed by shifting the answer cards B downwardly to move the answer data 9 into concealed position with respect to the windows 6 in the quiz card. After forming an answer in his mind to the problems on the quiz card, the student may instantly verify his answers by again raising the answer card so that the correct answers 9 appear through the windows 6. By repetition of the foregoing exercises, the correct answers to the problems will become firmly impressed upon the mind of the student. Thus, the device may be used not only for grading the answers upon the student's work sheet but it may also serve as a self-teaching device for the use of the student either in or out of the classroom. If desired, the answer card may be retained by the teacher until the student has completed the exercises—rather than distributed along with the panels and the quiz cards—this being a matter within the discretion of the teacher.

The quiz cards A and companion answer cards B may be printed or otherwise inscribed with different problems and answers, not only in arithmetic but in various other fields of study. For example, in Fig. 5 there is shown portions of a quiz card $A^1$, answer card $B^1$ and work sheet $C^1$ designed for the study of the Spanish language. Upon the quiz card is inscribed illustrations 7a immediately above the windows 6a. Upon the answer card $B^1$, immediately below its windows 8a are inscribed the names 9a, in Spanish, of the articles depicted by the illustrations. The work sheet $C^1$ is inserted behind the answer card for the use of the student in filling in his answers through the registering window openings 6a and 8a in the quiz and answer cards. After filling in the answers on the work sheet, the student may verify his answers by lifting the answer card $B^1$ upwardly to reveal through the windows 6a the correct Spanish names of the articles, in the same manner as previously described in connection with the embodiment of Figs. 1 through 4.

An important advantage resides in the provision of the pin 12 for locking the quiz card in the panel, since because of the sliding contact between the quiz card and the answer card there is a tendency for the quiz card to adhere to and be withdrawn along with the answer card when the latter is raised. Also when the device is used in the class room and the teacher selects and inserts the quiz cards in the panels, the locking pin prevents the loss of the cards from the panels while the latter are being distributed to the class. The cutaway portion 10a in the lower edge of the answer card B straddles the pin 12 and is not engaged thereby, thus allowing the answer card to be shifted upwardly or downwardly at will to expose or conceal the answers inscribed thereon.

Manifestly the invention is subject to embodiment in various other forms than those described above, which are to be regarded as exemplary rather than restrictive of the invention, without departing from the spirit of the invention as defined by the following claim.

I claim:

An educational device comprising the combination with a panel of generally rectangular outline having a backing member of stiff material closing the back of the panel and a frame supported in laterally-spaced relation to the backing member and providing an open slot along one side of said panel, of a quiz card and an answer card adapted to be slidably inserted through said slot into the space between the backing member and the frame, said quiz card and answer card having a plurality of windows in registry and complementary data inscribed adjacent the edges of the windows of the quiz and answer cards, the data on the quiz card being located along one side edge of its windows and the data on the answer card being located along the opposite side edge of its windows, a bayonet slot opening through an edge of the quiz card and a shiftable pin mounted on the frame extending into the space between the frame and the backing member for engaging the bayonet slot in the quiz card to releasably lock said quiz card in said panel and a cutaway portion in the edge of the answer card underlying the bayonet slot in the quiz card so as to clear the locking pin and allow the answer card to be moved for displaying the answer card data through the windows in the quiz card.

NATHAN PORITZ.

REFERENCES CITED

The following references are of record in the file of this patent:

UNITED STATES PATENTS

| Number | Name | Date |
|---|---|---|
| 633,354 | Blaine | Sept. 19, 1899 |
| 813,928 | Teller | Feb. 27, 1906 |
| 1,252,199 | Thompson | Jan. 1, 1918 |
| 1,367,550 | Jones | Feb. 8, 1921 |
| 1,490,934 | McDade | Apr. 22, 1924 |
| 1,617,657 | Studebaker | Feb. 15, 1927 |
| 1,781,047 | Bondeson | Nov. 11, 1930 |
| 1,892,318 | Pressey | Dec. 27, 1932 |
| 2,213,225 | Maggioni | Sept. 3, 1940 |